Dec. 16, 1930.  J. W. ALLEN  1,784,922

ELECTRICAL THERMOMETER

Original Filed Aug. 28, 1924

INVENTOR
JOSEPH W. ALLEN.
BY
Robert H. Young
ATTORNEY

Patented Dec. 16, 1930

1,784,922

UNITED STATES PATENT OFFICE

JOSEPH W. ALLEN, OF DAYTON, OHIO

ELECTRICAL THERMOMETER

Original application filed August 28, 1924, Serial No. 734,817. Divided and this application filed March 16, 1929. Serial No. 347,633.

(GRANTED UNDER THE ACT OF MARCH 3, 1883, AS AMENDED APRIL 30, 1928; 370 O. G. 757)

The invention described herein may be manufactured and used by or for the Government for governmental purposes without the payment to me of any royalty thereon.

This invention relates to heat measuring devices generally, and while particularly adapted for remote indicating electrical thermometers for indicating temperature changes in the cooling water of airplane engines and the like, it is capable of adaptation to other forms of devices such as pyrometers and the like, the present application being a divisional application of my former application filed on the 28th day of August, 1924, Serial No. 734,817.

The principal object of my invention consists in providing relatively contracting and expanding heat responsive elements for co-operating with an indicating mechanism to indicate the relative change in expansion or contraction of said heat responsive elements.

In carrying out my invention, I provide two heat responsive elements of a relatively high co-efficient of expansion which are so connected that when one of said elements is subjected to heat, it will expand or contract relative to the other, causing a movement of an indicator to indicate the amplitude of the relative movement of said elements.

In the accompanying drawing showing one embodiment of the invention—

Fig. 1 is a front view of the instrument together with a circuit diagram.

Fig. 2 is a diagrammatic view of the mechanical movement used in the instrument.

In an airplane installation the instrument 10 will be mounted at some convenient point in the cockpit and will be connected by conductors 11, 12 and 13, on binding posts 11¹, 12¹ and 13¹, with a resistance 14, battery 15, and variable resistance 16 respectively, located at remote points. A similar arrangement would be utilized in the case of an automobile installation and probably would be found desirable in the case of the application of the present invention to use in pyrometers.

The resistance 16 is conveniently in the form of a coil of wire having a relatively high temperature co-efficient of resistance, and in the case of an airplane installation will be immersed in the cooling fluid in order to be affected by the temperature changes thereof. The resistance 16 is connected in series with one branch 17 of a wire loop 18, the latter being grounded and connected as indicated by the connection 19 through the conductor 12 with the battery 15. The other branch 20 of the loop 18 is connected as indicated at 21 through the conductor 11 with the resistance 14, which in turn is connected, commonly with the resistance 16, and the battery 15. With this brief description it will be apparent that the current flowing in the branch 17 of the loop 18 is the same as that flowing through the resistance 16. Consequently, upon a change in resistance of the variable resistance 16 due to temperature change there will be a change in the current flow through the branch 17 of the loop 18. The current flow through the branch 20 of the loop 18 remains substantially constant since it is connected in series with the fixed resistance 14. As will be presently described, the instrument indicates by elongation of the loop 18 the extent of temperature change to which the variable resistance 16 is subjected.

The loop 18 is preferably of a very fine wire having a relatively high temperature co-efficient of expansion, so that small changes in current flowing therethrough will produce measurable temperature changes, and thereby produce measurable changes in the overall length of the loop 18 as the wire expands and contracts.

The two free ends of the loop 18 are rigidly fixed to stems 22 adjustable in posts 23 and held by set screws 24. The loop passes over a pulley 25 on a shaft 26 received in bearings in the free end of an arm 27, pivoted at 28 to swing in an arm. A stationarily mounted pulley 29 has a cord 30 passing over the same connected to a stud 31 on the arm 27 to communicate tension to the loop 18, from a coiled spring 32 secured to the free end of the cord 30 at one end and lodged in a post 33 at the other end. The pulley 25 has a gear 34 arranged to turn therewith upon movement of the arm 27 when the wire loop 18 elongates or contracts. The gear 34 meshes with a pinion 35 to turn a spindle 36 to which the needle 37 swinging relative to a scale 38 is rigidly affixed. The scale 38 is suitably calibrated in degrees of temperature change, the needle moving from left to right as indicated by the small arrow as the temperature, to which the resistance 16 is subjected, increases. It will be seen that the loop 18 is constantly under light tension by means of the arrangement shown and that a slight elongation of the branch 17 or a slight contraction thereof, due to a rise or fall of current therethrough, will result in a slight movement of the arm 27. In such movement the pulley 25 will be caused to rotate, thereby turning the gear 34 and causing the gear 35 to swing the needle 37 relative to the scale 38.

Aside from the advantage of lightness and simplicity, the instrument is particularly practical for airplane installations and the like, due to the fact that it may be located at a point remote from the place where the medium, whose temperature is to be taken, is located.

I claim:

1. In an electrical measuring instrument of the character described, a wire loop, a pivoted arm for a pulley over which said loop passes, tensioning means normally urging said arm outwardly to keep the loop taut, and means carried by said arm and movable relative to a scale upon turning of said pulley due to the expansion and contraction of said loop.

2. In an electrical measuring instrument of the character described, the combination of a loop of flexible wire, a pivoted arm, a pulley on said arm having said loop passing thereover, a tensioning spring keeping said pulley in position with said loop taut, gearing on said arm connected to said pulley to turn therewith when said arm moves due to the expansion and contraction of said loop, a scale, and a pointer connected with said gearing movable relative to said scale.

In testimony whereof I affix my signature.

JOSEPH W. ALLEN.